United States Patent
Lee et al.

(10) Patent No.: US 10,504,134 B2
(45) Date of Patent: Dec. 10, 2019

(54) METHOD FOR PROVIDING FOR ONE-BARCODE SERVICE, AND SYSTEM THEREFOR

(71) Applicant: SK PLANET CO., LTD., Seongnam-si, Gyeonggi-do (KR)

(72) Inventors: JongSoo Lee, Seoul (KR); MinSeok Namkoong, Goyang-si (KR); YoungWho Hwang, Seoul (KR); Hangmin Jo, Seongnam-si (KR); YoungTae Shim, Seongnam-si (KR)

(73) Assignee: SK PLANET CO., LTD., Seongnam-si, Gyeonggi-do (KR)

( * ) Notice: Subject to any disclaimer, the term of this patent is extended or adjusted under 35 U.S.C. 154(b) by 0 days.

(21) Appl. No.: 15/077,589

(22) Filed: Mar. 22, 2016

(65) Prior Publication Data

US 2016/0283968 A1 Sep. 29, 2016

(30) Foreign Application Priority Data

Mar. 26, 2015 (KR) ........................ 10-2015-0042282

(51) Int. Cl.
*G06Q 30/02* (2012.01)
(52) U.S. Cl.
CPC ................................ *G06Q 30/0236* (2013.01)
(58) Field of Classification Search
CPC ...... G06Q 20/105; G06Q 20/10; G06Q 20/36; G06Q 20/02; G06Q 20/351
See application file for complete search history.

(56) References Cited

U.S. PATENT DOCUMENTS

| | | | | |
|---|---|---|---|---|
| 5,590,038 A | * | 12/1996 | Pitroda | G06Q 20/02 235/380 |
| 6,886,741 B1 | * | 5/2005 | Salveson | G06Q 20/02 235/375 |
| 7,708,198 B2 | * | 5/2010 | Gangi | G06K 7/0004 235/380 |
| 2002/0062249 A1 | * | 5/2002 | Iannacci | G06Q 20/10 705/14.1 |

(Continued)

FOREIGN PATENT DOCUMENTS

KR       2004-0035460 A       4/2004

*Primary Examiner* — Christopher Stanford
(74) *Attorney, Agent, or Firm* — Fenwick & West LLP

(57) ABSTRACT

A method of providing a one-barcode service, and more particularly, to a method of providing a one-barcode service, in which a plurality of pieces of card information are registered using a single barcode, alliance company information in connection with each piece of card information are managed using the single barcode, and an alliance company service is used, and a system therefor. The method of providing the one-barcode service includes executing, by a terminal, a one-barcode service application and querying a service providing server for one-barcode issue information, receiving, by the terminal, one-barcode issue information including one or more of pieces of pre-issued card information corresponding to one-barcode identification information from the service providing server, and performing, by the terminal, a registration of alliance company information capable of being registered corresponding to the card information included in the one-barcode issue information by being in connection with the service providing server.

5 Claims, 9 Drawing Sheets

(56) References Cited

U.S. PATENT DOCUMENTS

| | | | | |
|---|---|---|---|---|
| 2004/0211830 A1* | 10/2004 | Algiene | G06Q 20/10 | 235/379 |
| 2007/0267479 A1* | 11/2007 | Nix | G06Q 20/10 | 235/379 |
| 2010/0114731 A1* | 5/2010 | Kingston | G06Q 20/10 | 705/26.1 |
| 2011/0226850 A1* | 9/2011 | Ungos | G06F 3/002 | 235/375 |
| 2011/0227928 A1* | 9/2011 | Ungos | G06Q 30/02 | 345/441 |
| 2011/0231268 A1* | 9/2011 | Ungos | G06Q 20/10 | 705/17 |
| 2013/0041725 A1* | 2/2013 | Moore | G06Q 30/0207 | 705/14.1 |
| 2013/0144794 A1* | 6/2013 | Denny | G06Q 40/02 | 705/76 |
| 2013/0159154 A1* | 6/2013 | Purves | G06Q 20/36 | 705/35 |
| 2013/0317928 A1* | 11/2013 | Laracey | G06Q 20/363 | 705/21 |
| 2014/0012749 A1* | 1/2014 | Lee | G06Q 20/367 | 705/40 |
| 2014/0129422 A1* | 5/2014 | Zhou | G06Q 40/025 | 705/38 |
| 2014/0337175 A1* | 11/2014 | Katzin | G06Q 20/204 | 705/26.62 |
| 2015/0026049 A1* | 1/2015 | Theurer | G06Q 20/36 | 705/41 |
| 2015/0220914 A1* | 8/2015 | Purves | G06Q 20/36 | 705/26.8 |

* cited by examiner

METHOD FOR PROVIDING FOR ONE-BARCODE SERVICE, AND SYSTEM THEREFOR

CROSS-REFERENCE TO RELATED APPLICATION

This application claims priority to and the benefit of Korean Patent Application No. 10-2015-0042282 filed in the Korean Intellectual Property Office on Mar. 26, 2015, the entire contents of which are incorporated herein by reference.

TECHNICAL FIELD

The present invention relates to a method of providing a one-barcode service, and more particularly, to a method of providing a one-barcode service, in which a plurality of pieces of card information are registered using a single barcode, alliance company information in connection with each piece of card information is managed using the single barcode, and an alliance company service is used, and a system therefor.

BACKGROUND

Content described herein simply provides background information of the present embodiment and does not configure the related art.

Recently, with the increase of point of sale (POS) systems or various management operating systems and the sophistication of sales strategy, customer membership services are generally provided by small and medium-sized service providers as well as large-sized service providers. The customer membership services can provide more benefits to loyal customers and the loyalty of the customers can be increased, and at the same time, fixed income can be ensured for companies. Therefore, service providers in almost all fields such as beauty, game, mobile communication, food service, and the like issue membership cards and are providing customer services based on the membership cards.

With the generalization of the membership services, corresponding customers are enjoying the benefits of various membership services, and on the other hand, have the hassle of the possession and management of the membership cards issued by various companies and fields.

That is, generally, the membership cards are distributed in a form of a plastic card, and thus it is inconvenient that users should always possess the corresponding membership cards. In order to improve the above problem, recently, mobile membership card services based on smart phones are being proposed, but there is a problem in that each member card should also be individually issued and managed in the current mobile membership card services.

In addition, recently, membership services in connection with various cards used by a user, such as a credit card, a debit card, an identification (ID) card, and the like are proposed, but in order for the user to use the membership services, there is a problem in that a separate card issuing procedure should be performed and at the same time a registration procedure for each membership service should be performed.

PRIOR ART DOCUMENT

Patent Literature

Korean Unexamined Patent Application Publication No. 2004-0035460, published on Apr. 29, 2004 (Name: Membership Payment System and Method using Membership Card)

SUMMARY

The present invention provides a method of providing a one-barcode service, in which a plurality of pieces of card information are registered using a single barcode and alliance services in connection with each card are managed using the single barcode, and a system therefor.

In particular, the present invention provides a method of providing a one-barcode service in which a user more easily subscribes and registers to alliance services in connection with a corresponding card after card registration and more easily uses the alliance services without entering additional user information for registering the alliance services, and a system therefor.

However, the scope of the present invention is not limited to the above-described objects, and other unmentioned objects may be clearly understood from the following descriptions.

According to an aspect of the present invention, there is provided a method of providing a one-barcode service. The method of providing the one-barcode service includes executing, by a terminal, a one-barcode service application and querying a service providing server for one-barcode issue information, receiving, by the terminal, one-barcode issue information including one or more of pieces of pre-issued card information corresponding to one-barcode identification information from the service providing server, and performing, by the terminal, a registration of alliance company information capable of being registered corresponding to the card information included in the one-barcode issue information by being in connection with the service providing server.

In this case, the method may include, before the querying to the service providing server, transmitting, by the terminal, card issuing request information including terminal identification information to a card company server and requesting a card issuing, requesting, by the card company server, a transmission of one-barcode identification information including the terminal identification information from the service providing server according to a request of the terminal, determining, by the service providing server, whether pre-issued one-barcode identification information corresponding to the terminal identification information is present or not, transmitting, when it is determined that the pre-issued one-barcode identification information is present, the corresponding one-barcode identification information to the card company server, and generating one-barcode identification information corresponding to the terminal identification information and transmitting the generated one-barcode identification information to the card company server when it is determined that the pre-issued one-barcode identification information is not present, and completing, by the card company server, a card issuing process according to a request of the terminal as the one-barcode identification information is received from the service providing server.

Also, the performing of the registration of the alliance company information by being in connection with the service providing server may include generating, by the terminal, virtual cards corresponding to the card information included in the one-barcode issue information, requesting, by the terminal, the service providing server to generate a one-barcode as a selection of any one virtual card among the generated virtual cards is input, performing, by the service providing server, a registration of the alliance company information according to a request of the terminal, and completing, by the terminal, a generation of the one-barcode as the performing of the registration of the alliance company information is completed.

Also, the performing of the registration of the alliance company information may include determining, by the service providing server, whether an available alliance company corresponding to the one-barcode identification information is registered or not, requesting, by the service providing server, a registration agreement of the available alliance company from the terminal when it is determined that the available alliance company is not registered, transmitting, by the service providing server, the one-barcode identification information to the corresponding alliance company server as a registration acceptance of the alliance company is received from the terminal, and notifying, by the service providing server, the terminal of a registration completion and performing supporting so that the one-barcode in which the registration of the alliance company is performed is generated in the terminal as the registration completion is notified from the alliance company server.

According to another aspect of the present invention, there is provided a method of providing a one-barcode service. The method of providing the one-barcode service includes receiving, by a service providing server, a request of one-barcode identification information corresponding to a terminal from a card company server according to a request of the terminal, determining, by the service providing server, whether pre-issued one-barcode identification information corresponding to the terminal is present or not, and transmitting the pre-issued one-barcode identification information to the card company server when it is determined that the pre-issued one-barcode identification information is present, transmitting, by the service providing server, one-barcode issue information including one or more pieces of pre-issued card information to the terminal according to a request of the terminal, transmitting, by the service providing server, the pre-issued one-barcode identification information to the corresponding alliance company server when a request of a registration agreement of alliance company information capable of being registered corresponding to the card information is received from the terminal and completing the registration of the alliance company, and notifying, by the service providing server, the terminal of a registration guidance of the alliance company In this case, the transmitting of the pre-issued one-barcode identification information to the card company server may include generating, by the service providing server, one-barcode identification information in a serial number form according to one or more combinations of terminal identification information, card company identification information, and a random number when the pre-issued one-barcode identification information corresponding to the terminal is not present and transmitting the generated one-barcode identification information to the card company server.

Also, the completion of the registration of the alliance company may include receiving, by the service providing server, a request of a generation of one-barcode from the terminal as a selection of any one virtual card among virtual cards generated corresponding to the card information is input, determining, by the service providing server, whether an available alliance company corresponding to the one-barcode identification information is registered or not, requesting, by the service providing server, a registration agreement of the available alliance company from the terminal when it is determined that the available alliance company is not registered, and transmitting, by the service providing server, the one-barcode identification information to the corresponding alliance company server and completing the registration as the registration acceptance of the alliance company is received from the terminal.

In addition, the present invention may provide a computer-readable recording medium recording a program that executes the method of providing the one-barcode service as described above.

According to still another aspect of the present invention, there is provided a system of providing a one-barcode service. The system of providing the one-barcode service includes a terminal which executes a one-barcode service application, queries a service providing server for one-barcode issue information, and performs a registration of alliance company information capable of being registered corresponding to card information by being in connection with the service providing server when the one-barcode issue information including one or more pieces of pre-issued card information corresponding to one-barcode identification information is received from the service providing server, and a service providing server which transmits the one-barcode issue information to the terminal according to a request of the terminal when a request of a registration agreement of the alliance company information capable of being registered corresponding to the card information is received from the terminal, transmits the pre-issued one-barcode identification information to the corresponding alliance company server, completes the registration of the alliance company, and guides the terminal of the completion of the registration of the alliance company.

In this case, the system may further include a card company server which requests one-barcode identification information from the service providing server according to a request of the terminal and completes a card issuing process of the terminal when the one-barcode identification information is received from the service providing server, and the service providing server may map the card information of the card company server to the one-barcode identification information issued corresponding to the terminal to store the mapping information.

According to the method of providing the one-barcode service and the system therefor of the present invention, a plurality of pieces of card information can be registered using a single barcode and alliance services in connection with each card can be managed using the single barcode.

Thus, according to the present invention, a user can more easily subscribe and register to alliance services in connection with a corresponding card after card registration and more easily use the alliance services without entering additional user information for registering the alliance services.

In addition, various effects other than the above-described effects can be directly or implicitly disclosed in the detailed descriptions of the embodiments of the present invention to be described below.

DETAILED DESCRIPTION

Figure 1:
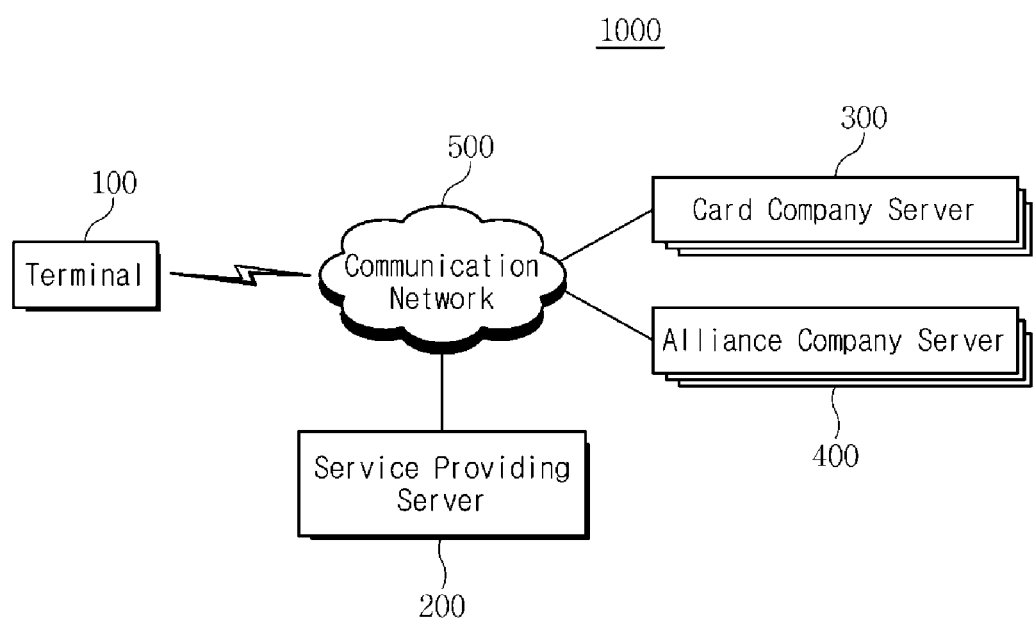
FIG. 1 is a configuration diagram schematically illustrating a system for a method of providing a one-barcode service according to an embodiment of the present invention.

In order to more precisely describe features and advantages of the technical solutions of the present invention, the present invention will be described more fully with reference to example embodiments illustrated the accompanying drawings.

However, detailed descriptions of well-known functions or configurations that unnecessarily obscure the gist of the invention in the following explanations and accompanying drawings will be omitted. The same reference numbers will be used throughout this specification to refer to the same or like parts.

Terms and words used in the following descriptions and drawings should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way. Therefore, since the embodiments described in this specification and configurations illustrated in drawings are only exemplary embodiments and do not represent the overall technological scope of the invention, it is understood that the invention covers various equivalents, modifications, and substitutions at the time of filing of this application.

It will be understood that, although the terms first, second, etc. may be used herein to describe various elements, these elements should not be limited by these terms. These terms are used only to distinguish one element from another. For example, a first element could be termed a second element, and a second element could be termed a first element, without departing from the scope of the present invention.

Moreover, when an element is referred to as being "connected" or "coupled" to another element, it can be logically or physically connected or coupled to the other element. In other words, it will be understood that when an element is referred to as being "connected" or "coupled" to another element, it can be directly connected or coupled to the other element, intervening elements may be present, or it can be indirectly connected or coupled to the other element.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or groups thereof.

In addition, the embodiments in the scope of the present invention include a computer-readable medium which has or transmits computer-executable instructions or a data structure stored in the computer-readable medium. The computer-readable medium may be any medium that can be accessed and used by a general-purpose or special-purpose computer system. As an example, the computer-readable medium may include a random access memory (RAM), a read only memory (ROM), an erasable programmable ROM (EPROM), a compact disk ROM (CD-ROM) or other optical disk storage devices, a magnetic disk storage device or other magnetic storage devices, or a physical storage medium such as any medium that can be used to store or transmit computer-executable instructions, computer-readable instructions or a predetermined program coding device formed in a data structure and accessed by a general-purpose or special-purpose computer system, but is not limited thereto. In the following descriptions and claims, a "network" is defined as one or more data links in which electronic data may be transmitted between computer systems and/or modules. When information is transmitted or provided to the computer system through the network or other communication connections (wired, wireless, or a combination thereof), the connection may be understood as a computer-readable medium. A computer-readable instruction includes, for example, an instruction and data for performing a specific function or a group of functions by the general-purpose computer system or the special-purpose computer system. A computer-executable instruction may be, for example, a binary or intermediate format instruction such as an assembly language, or even source codes.

In addition, the present invention may be performed in a network computing environment having various types of computer system configuration including personal computers, laptop computers, hand-held devices, multiprocessor systems, microprocessor-based or programmable consumer electronics, network PCs, minicomputers, mainframe computers, mobile phones, personal digital assistants (PDAs), pagers, or the like. Further, the present invention may be performed in a distributed system environment in which both local and remote computer systems linked through a network using a wired data link, a wireless data link, or a combination thereof perform tasks. In the distributed system environment, the program module may be located in local and remote memory storage devices.

Now, a method of providing a one-barcode service according to an embodiment of the present invention and a system therefor will be described with reference to the drawings in detail.

First, a system for a method of providing a one-barcode service according to an embodiment of the present invention will be described.

FIG. 1 is a configuration diagram schematically illustrating a system for a method of providing a one-barcode service according to an embodiment of the present invention.

Referring to FIG. 1, a system 1000 for the method of providing the one-barcode service according to an embodiment of the present invention may include a terminal 100 and a service providing server 200. In addition, the system 1000 may further include a card company server 300 which issues cards, stores and manages information on the issued cards according to a request of the terminal 100, and an alliance company server 400 which supports available alliance services corresponding to the cards, and may include a communication network 500 which supports the communication of information between the respective devices.

When each component is schematically described, first, the terminal 100 refers to a user's device capable of transceiving various pieces of information via the communication network 500 according to a user's operation. The terminal 100 may perform voice or data communication through the communication network 500 and may transmit and receive various pieces of information to and from the service providing server 200. To this end, the terminal 100 of the present invention may include a browser which transceives information, a memory which stores a program and a protocol, a microprocessor which executes, computes, and controls various programs, and the like.

Specifically, the terminal 100 according to an embodiment of the present invention may access the card company server 300 through the communication network 500, request a card issuing, perform a one-barcode service application provided by the service providing server 200 after the card issuing is completed, and support overall processes for generating a one-barcode and a process of registering alliance services through the connection between the service providing server 200 and the alliance company server 400. Then, when the one-barcode generation is completed, the terminal 100 may use a card service mapped to the one-barcode, and the alliance services in connection with each card service.

An operation method of the terminal 100 will be described below in more detail, and the terminal 100 according to an embodiment of the present invention may be implemented in various forms. For example, the terminal 100 described in this specification may use a fixed terminal such as a smart TV, a desktop computer, or the like as well as a mobile terminal such as a smart phone, a tablet PC, a PDA, a portable multimedia player (PMP), an MP3 player, or the like.

According to the convergence trend of digital devices, portable devices may be deformed in various ways, and thus these may not be enumerated. However, a unit having the same level as the above-described units may be used as the terminal 100 of the present invention. Any device as long as it can transmit and receive information to and from the service providing server 200 and the card company server 300 through the communication network 500 may be applied to the terminal 100 of the present invention.

The service providing server 200 denotes a device which supports the method of providing the one-barcode service according to an embodiment of the present invention. Specifically, the service providing server 200 according to an embodiment of the present invention may transmit one-barcode issue information to the terminal 100 according to a request of the terminal 100. When an alliance company information registration agreement request capable of being registered corresponding to card information is received from the terminal 100, the service providing server 200 may transmit pre-issued one-barcode identification information to the corresponding alliance company server 400, complete the alliance company registration, and then support overall processes which guides the terminal 100. In other words, when the terminal 100 requests the card company server 300 to issue a card, the card company server 300 requests the service providing server 200 to issue a one-barcode identification information corresponding to terminal identification information, and the service providing server 200, which receives the request, issues the one-barcode identification information according to the request of the card company server 300 even when there is no additional user input from the user of the terminal 100.

Then, when the one-barcode service application provided by the service providing server 200 is executed according to the user request of the terminal 100, the service providing server 200 may transmit the pre-issued one-barcode identification information to the terminal 100 according to the request of the card company server 300, and the terminal 100 may generate a one-barcode based on the pre-issued one-barcode identification information. Further, when the one-barcode is generated, the service providing server 200 requests the corresponding alliance company server 400 to automatically register the alliance services even when there is no additional user information provided to the service providing server 200 or user input. Further, the service providing server 200 according to an embodiment of the present invention may serve to provide and manage the one-barcode service application to the terminal 100.

Main components and operation methods of the terminal 100 and the service providing server 200 will be described below in more detail, and the card company server 300 according to an embodiment of the present invention refers to a device which processes a card registration service requested by the terminal 100. Specifically, the card company server 300 according to an embodiment of the present invention requests the one-barcode identification information from the service providing server 200 according to the request of the terminal 100, and the card issuing process of the terminal is completed when the one-barcode identification information is received from the service providing server 200. Here, any card may be used as a card of the present invention as long as it can be in connection with the alliance company server 400 and used in the alliance company, such as a credit card, a debit card, an ID card, a membership card, or the like, and it should be noted that there is no limitation on functions. Further, the card of the present invention may present in a physical form such as a magnetic card and in a software form such as a mobile card.

In addition, the alliance company server 400 denotes a device which is in connection with the specific card company server 300 and supports the providing of the affiliated alliance service to the user which subscribes to the corresponding card. Specifically, the alliance company server 400 according to an embodiment of the present invention is in connection with the service providing server 200 rather than the terminal 100 and supports a registration process of the alliance service capable of being provided to the terminal 100.

A processor mounted on each device according to an embodiment of the present invention may process program instructions for executing the method according to the present invention. In an embodiment, the processor may be a single-threaded processor, and in another embodiment, the processor may be a multithreaded processor. Furthermore, it is possible for the processor to process instructions stored in a memory or a storage device.

Further, the terminal 100, the service providing server 200, the card company server 300, and the alliance company server 400 according to an embodiment of the present invention may transceive various pieces of related information through the communication network. In this case, it is preferable that the communication network 500 use a wireless communication method such as a Wireless Local Area Network (WLAN), a Wi-Fi, a WiBro, a Worldwide Interoperability for Microwave Access (WiMAX), High Speed Downlink Packet Access (HSDPA), or the like, but is not limited thereto. According to a system implementing method, the communication network 500 may use a wired communication method such as Ethernet, a Digital Subscriber Line (xDSL, Asymmetric Digital Subscriber Line (ADSL) or Very-high-bit-rate Digital Subscriber Line (VDSL)), Hybrid Fiber Coaxial cable (HFC), Fiber to the Curb (FTTC), Fiber to the Home (FTTH), or the like.

In addition, the communication network 500 of the present invention may include, for example, a plurality of access networks (not illustrated) and core networks (not illustrated), and an external network such as the Internet (not illustrated). Here, the access network (not illustrated), which is an access network which communicates with the terminal 100 in a wired or wireless method, may be implemented as, for example, a plurality of base stations such as a Base Station (BS), a Base Transceiver Station (BTS), a NodeB, an Evolved Node B (eNodeB), and the like, and base station controllers such as a Base Station Controller (BSC) and a Radio Network Controller (RNC). Further, as described above, a digital signal processing unit and a wireless signal processing unit, which are integrally implemented in the base station, may be divided into a digital unit (hereinafter, referred to as a "DU") and a radio unit (hereinafter, referred to as an "RU"), a plurality of RUs (not illustrated) may be installed in a plurality of regions, and the plurality of RUs (not illustrated) may be connected to the centralized DU (not illustrated).

Further, the core network (not illustrated) which constitutes the mobile network with the access network (not illustrated) serves to connect the access network (not illustrated) to the external network, for example, the Internet (not illustrated).

The core network (not illustrated), as described above, which is a network system which performs main functions for mobile communication services, such as mobility control and switching between the access networks (not illustrated), performs circuit switching or packet switching, and manages and controls a packet flow in the mobile network. Further, the core network (not illustrated) may serve to manage the mobility between frequencies and manages the traffic in the access network (not illustrated) and the core network (not illustrated), and be in connection with other networks, for example, the Internet (not illustrated). The core network (not illustrated) may further include a Serving Gateway (SGW), a PDN Gateway (PGW), a Mobile Switching Center (MSC), a Home Location Register (HLR), a Mobile Mobility Entity (MME), a Home Subscriber Server (HSS), or the like.

Further, the Internet (not illustrated), which denotes a conventional public communication network that is, a public network in which information is exchanged according to a Transmission Control Protocol/Internet Protocol (TCP/IP), may be connected to the service providing server 200, may provide information provided from the service providing server 200 to the terminal 100 via the access network (not illustrated) and the core network (not illustrated), and may provide information provided from the terminal 100 to the service providing server 200 via the access network (not illustrated) and the core network (not illustrated).

Hereinafter, main components and operation methods of the terminal 100 according to an embodiment of the present invention will be described.

Figure 2:
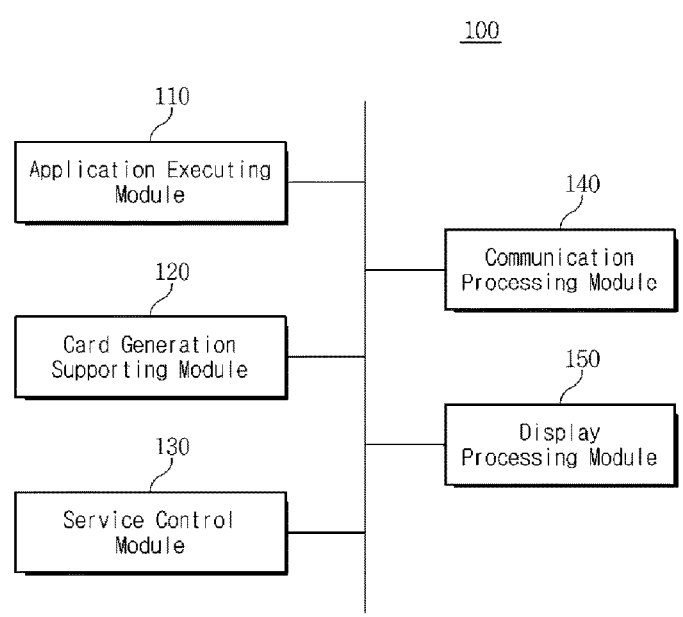
FIG. 2 is a block diagram illustrating main components of a terminal according to the embodiment of the present invention.

FIG. 2 is a block diagram illustrating main components of a terminal according to an embodiment of the present invention.

Referring to FIGS. 1 and 2, the terminal 100 according to an embodiment of the present invention may include an application executing module 110, a card generation supporting module 120, a service control module 130, a communication processing module 140, and a display processing module 150.

Here, the 'module', which is a component which performs a predetermined function, may be implemented by hardware, software, or a combination thereof. For example, the 'module' may refer to a program module, and include components, such as software components, object-oriented software components, class components, and task components, which are executed by a processor and perform predetermined functions, processes, functions, attributes, procedures, subroutines, segments of program code, drivers, data, databases, data structures, arrays, and variables. Further, the components and the functions provided in '~ modules' may be coupled to a fewer number of components and '~ modules', or may further divided into additional components and '~ modules.'

When each module constituting the terminal 100 of the present invention is described in more detail, the application executing module 110 serves to support overall processes of the one-barcode service application provided by the service providing server 200. Here, the application executing module 110 may serve to execute the one-barcode service application using information stored in a state in which various pieces of information, which are required when the one-barcode service application is executed, and request the service providing server 200 to execute the one-barcode service application according to a cloud streaming service method, and decode and output a result screen.

According to the embodiment of the present invention, the card generation supporting module 120 may request the card company server 300 to issue a card, and control overall processes of the one-barcode generation. For example, the card generation supporting module 120 may request the card company server 300 to issue the card. In this case, the card generation supporting module 120 may support overall processes of transmitting various pieces of information required for the card issuing to the card company server 300. For example, when the card issued by the card company server 300 is an ID card, the card generation supporting module 120 may provide information such as a school name, a grade, or the like to the card company server 300, and when the card issued by the card company server 300 is a credit card, the card generation supporting module 120 may provide information such as a company name, a rank, or the like to the card company server 300.

However, in order to implement the embodiment of the present invention, it is preferable that the card generation supporting module 120 provide terminal identification information to distinguish the terminal 100 together with the request when the card generation supporting module 120 requests the card company server 300 to issue the card. Here, any information as long as it can be used to distinguish the terminal such as a phone number of the terminal 100, a device number of the terminal 100, or the like may be used as the terminal identification information of the present invention.

Further the card generation supporting module 120 according to an embodiment of the present invention may serve to support a process of generating a virtual card according to the one-barcode identification information when the one-barcode identification information is received from the service providing server 200, request an alliance company registration with respect to any one virtual card selected by the user among virtual cards from the service providing server 200, and generate a one-barcode when the alliance company registration is completed in the service providing server 200. Here, the generated one-barcode may present in a one-dimensional or two-dimensional barcode form.

The service control module 130 may perform an overall control of each module in the embodiment of the present invention, and may support a process of transmitting information requested by the application executing module 110 and the card generation supporting module 120 to the service providing server 200 via the communication processing module 140, and a process of transmitting information received from the service providing server 200 via the communication processing module 140 to each corresponding module. Further, the service control module 130 may support a process of outputting information generated by the application executing module 110 and the card generation supporting module 120 through the display processing module 150.

Detailed operations of the terminal 100 according to an embodiment of the present invention may be understood more clearly through a flowchart to be described below.

Hereinafter, main components and operation methods of the service providing server 200 according to an embodiment of the present invention will be described.

Figure 3:
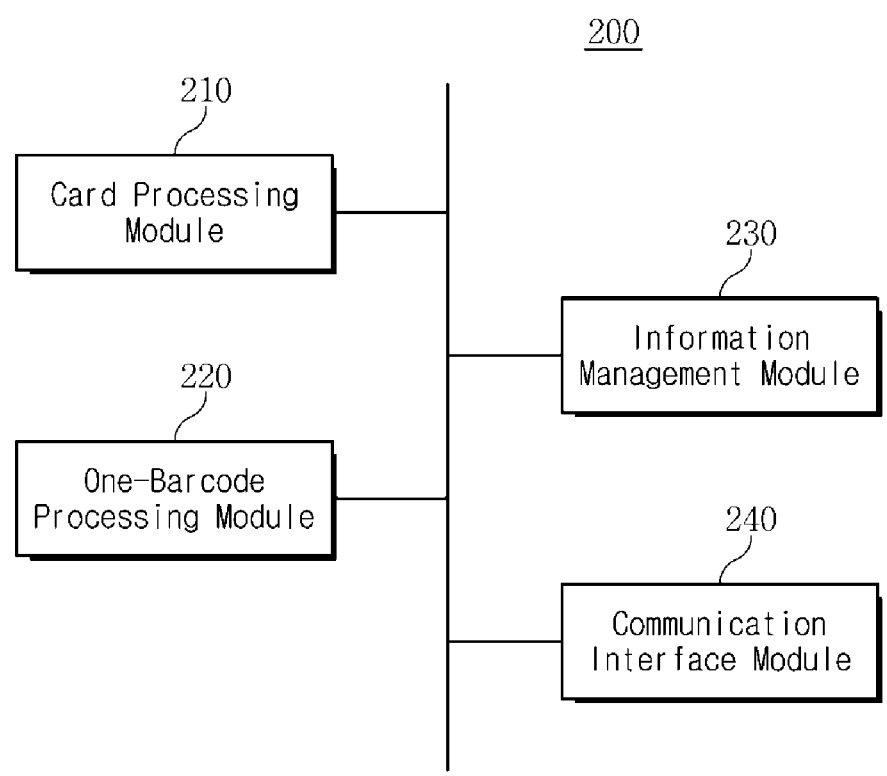
FIG. 3 is a block diagram illustrating main components of a service providing server according to the embodiment of the present invention.

FIG. 3 is a block diagram illustrating main components of the service providing server 200 according to an embodiment of the present invention.

Referring to FIGS. 1 and 3, the service providing server 200 according to an embodiment of the present invention may include a card processing module 210, a one-barcode processing module 220, an information management module 230, and a communication interface module 240.

Among these components, the card processing module 210 supports a process in which one-barcode identification information corresponding to the terminal identification information is generated and issued by being in connection with the card company server 300. For example, the card processing module 210 may receive a one-barcode identification information transmission request from the card company server 300 via the communication interface module 240 according to a request of the terminal 100. In this case, information of the one-barcode identification information transmission request may include terminal identification information for identifying the terminal 100 and card company identification information for identifying the card company server 300 which may then be transmitted together. Here, the card company identification information may include information on corporate identity (CI). The card processing module 210 which receives the one-barcode identification information queries and determines whether pre-issued one-barcode identification information corresponding to the terminal identification information is present or not to the information management module 230. When it is determined that the pre-issued one-barcode identification information corresponding to the terminal identification information is not present, the card processing module 210 may generate one-barcode identification information corresponding to the terminal identification information. Here, the one-barcode identification information, which is information granted by the card processing module 210 in order to manage and identify the one-barcode corresponding to the terminal identification information, may be generated in a form of a serial number according to a number of combination methods such as the terminal identification information, card company identification information, a random number, and the like. However, the present invention is not limited thereto, and any information as long as it can be granted in a unique form corresponding to the terminal 100 may be generated as the one-barcode identification information using any method.

When the one-barcode identification information is generated through these processes, the card processing module 210 may transmit the one-barcode identification information to the card company server 300 through the communication interface module 240, and support a process in which information on the transmission to the information management module 230 is transmitted and the one-barcode identification information and card information corresponding to the terminal identification information are stored.

The one-barcode processing module 220 may support a process in which the alliance company corresponding to the one-barcode is registered by being in connection with the alliance company server 400. Specifically, when one-barcode issue information is received from the terminal 100 via the communication interface module 240, the one-barcode processing module 220 according to an embodiment of the present invention determines whether the pre-issued one-barcode identification information is present or not in the terminal 100 by being in connection with the information management module 230. Also, the one-barcode processing module 220 determines whether the card information corresponding to the pre-issued one-barcode identification information is present or not, and then may transmit the one-barcode issue information including the one-barcode identification information and the card information corresponding to the one-barcode identification information to the terminal 100.

The terminal 100 which receives the one-barcode issue information may generate the virtual card according to pre-issued card information corresponding to the one-barcode identification information to display so that the user can recognize the virtual card, and receive a one-barcode generation request from the terminal 100 when it is determined that a selection for any one virtual card is input from the user of the terminal 100.

When such a request is received, the one-barcode processing module 220 may determine whether an available alliance company corresponding to the one-barcode identification information is registered or not according to the one-barcode generation request from the terminal 100. When it is determined that the available alliance company is not registered, the one-barcode processing module 220 may perform a procedure in which the alliance company information is registered.

That is, the one-barcode processing module 220 may transmit an alliance company registration agreement request to the terminal 100. When an alliance company registration acceptance is received from the terminal 100, the one-barcode processing module 220 may transmit the terminal identification information of the terminal 100 and the one-barcode identification information to the corresponding alliance company server 400, and support a process in which the alliance company server 400 registers and stores the terminal identification information of the terminal 100 and the one-barcode identification information.

Detailed operations of the service providing server 200 according to an embodiment of the present invention may be understood more clearly through a flowchart to be described below.

Hereinafter, a method of providing a one-barcode service according to an embodiment of the present invention will be described with reference to FIGS. 4 to 8.

Figure 4:
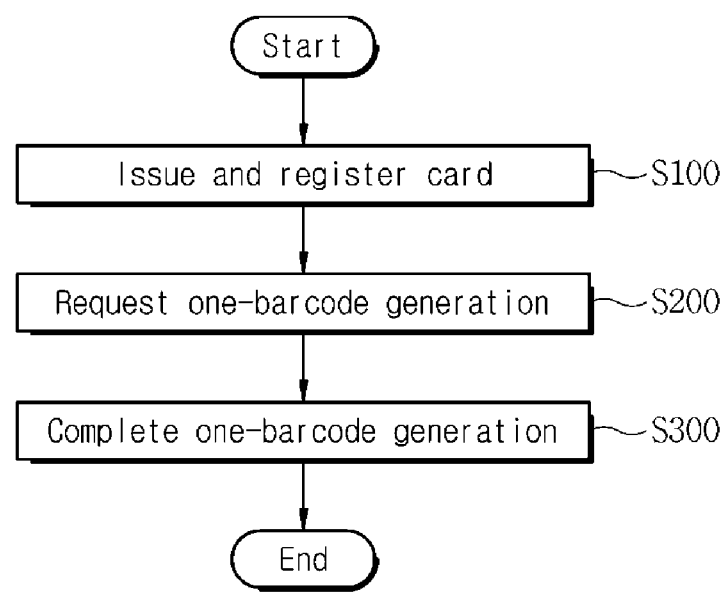
FIG. 4 is a schematic flowchart for describing the method of providing the one-barcode service according to the embodiment of the present invention.

FIG. 4 is a schematic flowchart for describing the method of providing the one-barcode service according to an embodiment of the present invention.

Referring to FIGS. 1 and 4, the method of providing the one-barcode service according to an embodiment of the present invention may mainly include a card issuing and registration operation (S100), a one-barcode generation request operation (S200), a one-barcode generation completion operation (S300).

Here, the card issuing and registration operation denotes a process in which a terminal 100 requests the card company server 300 to register a card and a card is issued from the card company server 300. The one-barcode generation request operation denotes a process in which a one-barcode is generated by the service providing server 200 according to card information issued from the card company server 300 itself when the terminal 100 initially executes a one-barcode service application. Also, the one-barcode generation completion operation denotes a process in which the alliance company corresponding to each card information is registered through a connection between the service providing server 200 and the alliance company server 400, information on the alliance company is provided to the terminal 100, the terminal 100 registers a plurality of pieces of card information through a single one-barcode, and the alliance company information corresponding to each of the plurality of pieces of card information is automatically registered.

Through each operation of the present invention, the card registration from the card company server 300 is completed and at the same time the user of the terminal 100 may more easily register and use the corresponding alliance company information in each card, and may register the plurality of pieces of card information using the single barcode and use the alliance company.

Hereinafter, the method of providing the one-barcode service according to an embodiment of the present invention will be described in more detail.

Figure 5:
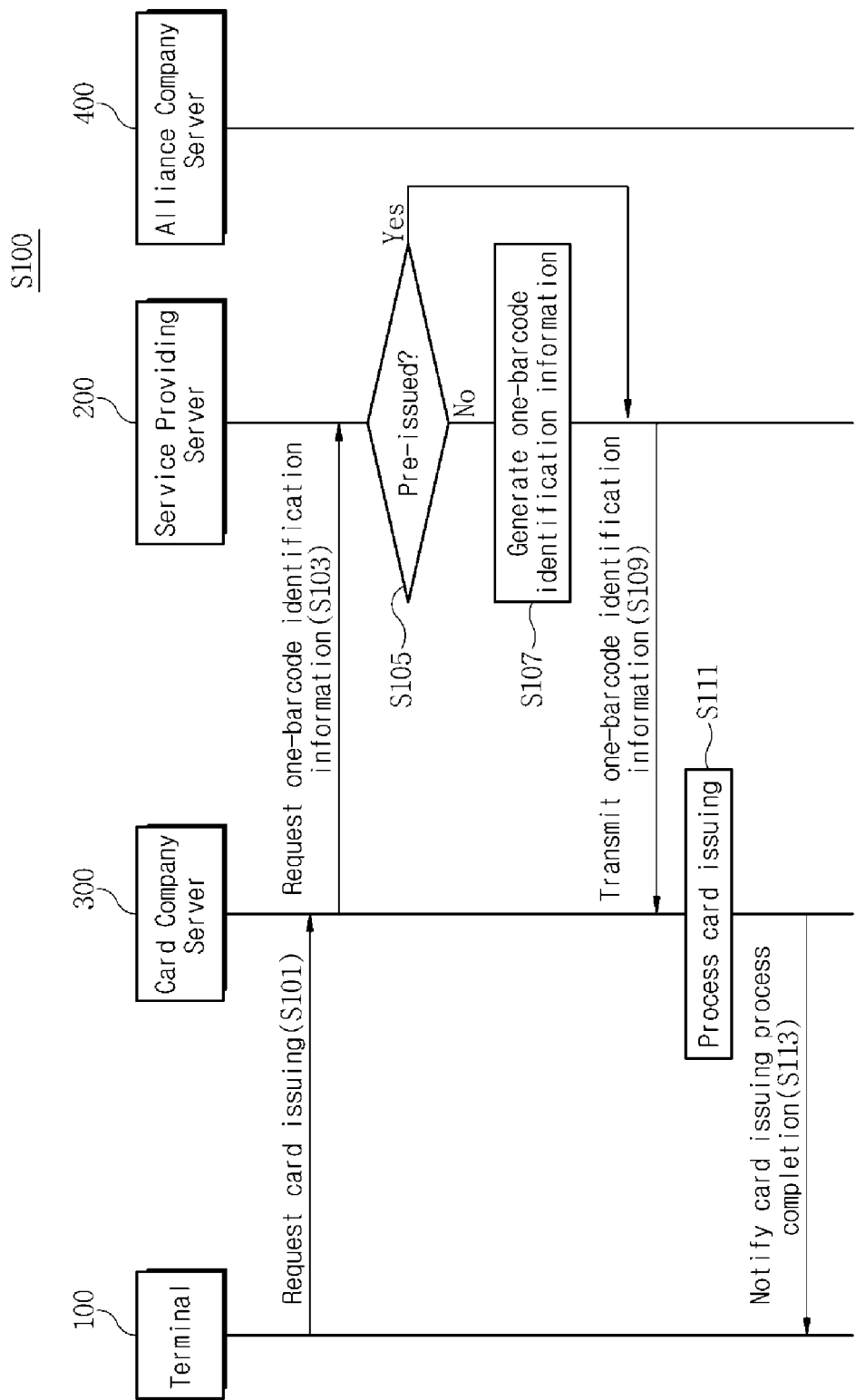
FIGS. 5 to 7 are data flowcharts for describing the method of providing the one-barcode service according to the embodiment of the present invention in more detail.
Figure 6:
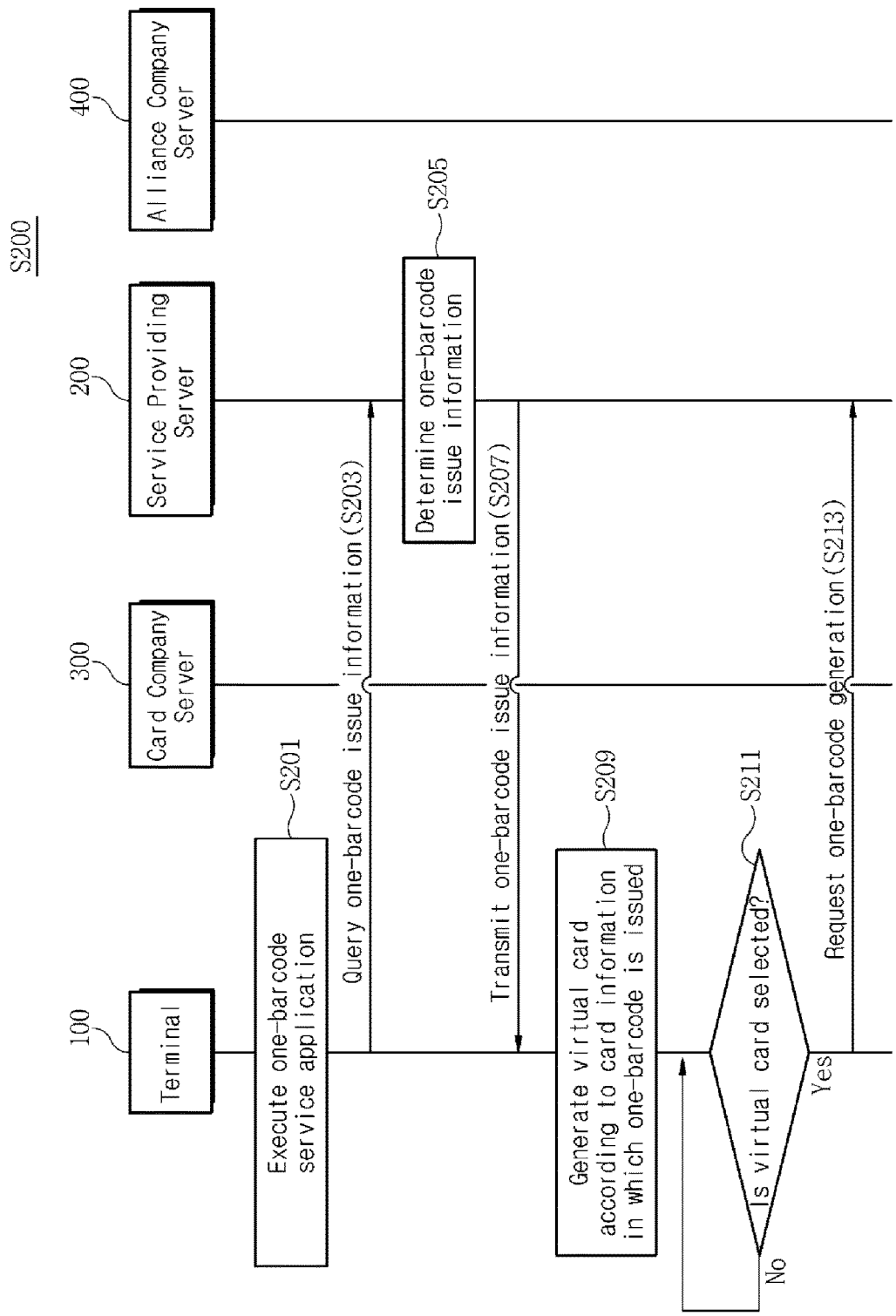
Figure 7:
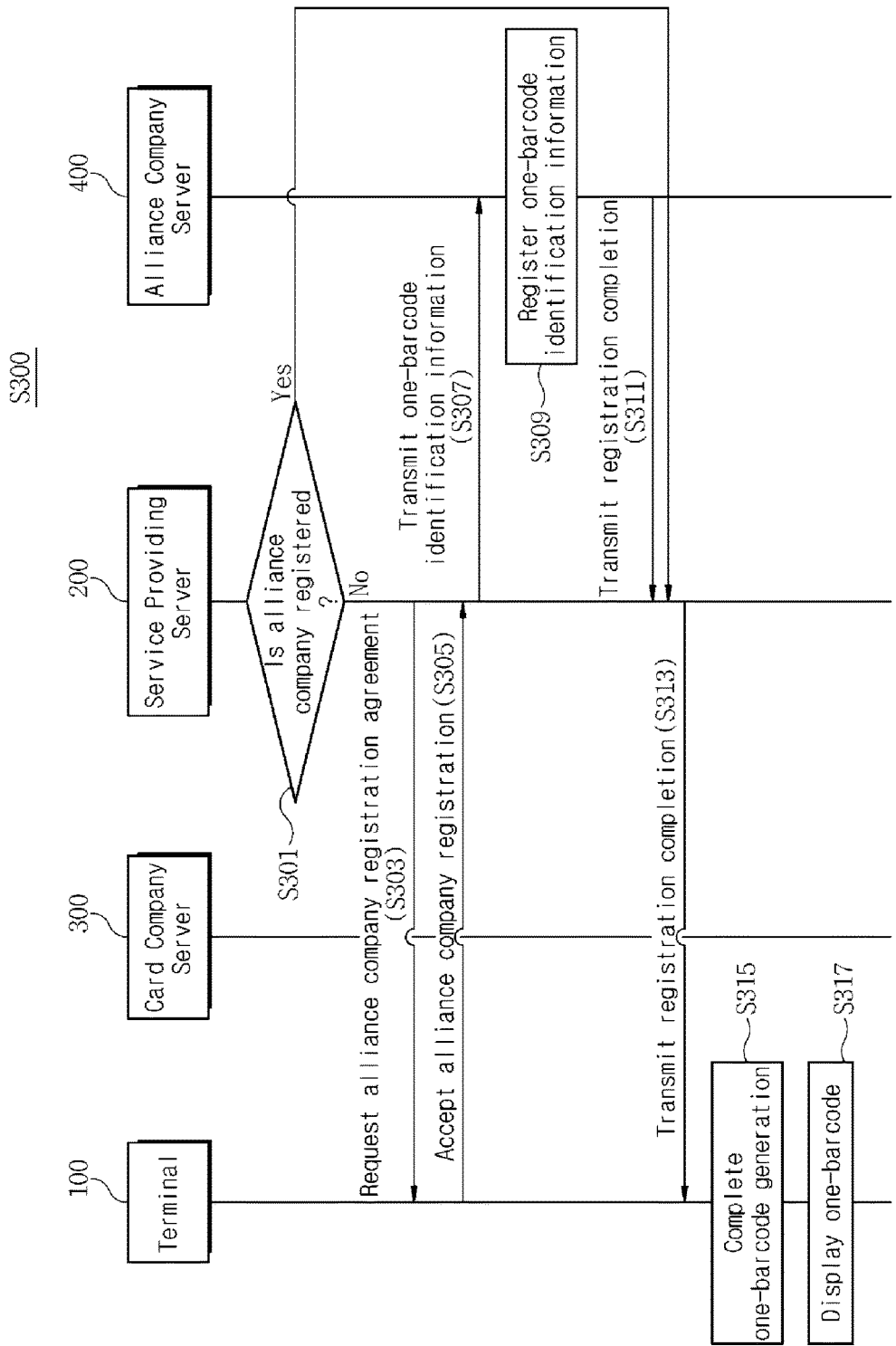

FIGS. 5 to 7 are data flowcharts for describing the method of providing the one-barcode service according to an embodiment of the present invention in more detail. Specifically, FIG. 5 is a data flowchart for describing the card issuing and registration operation (S100) illustrated in FIG. 4 in more detail, FIG. 6 is a data flowchart for describing the one-barcode generation request operation (S200) illustrated in FIG. 4 in more detail, and FIG. 7 is a data flowchart for describing the one-barcode generation completion operation (S300) illustrated in FIG. 4 in more detail.

First, referring to FIG. 5, the card issuing and registration operation according to an embodiment of the present invention may be made by the terminal 100 requesting the card company server 300 to issue a card (S101). Here, any card as long as it can be used in an alliance company by being in connection with the alliance company server 400, such as a credit card, a debit card, an ID card, a membership card, or the like, may be used as the card of the present invention, and it should be noted that there is no limitation on the function. Further, the card of the present invention may present in a physical form such as a magnetic card and in a software form such as a mobile card.

In addition, when the terminal 100 requests the company server 300 to issue a card, various pieces of information required for the card issuing may be transmitted to the card company server 300. The various pieces of information required for the card issuing may be changed according to a card type. For example, when the card issued by the card company server 300 is an ID card, the terminal 100 may provide information such as a school name, a grade, or the like to the card company server 300, and when the card issued by the card company server 300 is a credit card, the terminal 100 may provide information such as a company name, a rank, or the like to the card company server 300.

However, in order to implement the embodiment of the present invention, it is preferable that the terminal 100 provide terminal identification information in order to distinguish the terminal 100 together with a request when the terminal 100 requests the card company server 300 to issue the card. Here, any information as long as it can be used to distinguish the terminal such as a phone number of the terminal 100, a device number of the terminal 100, or the like may be used as the terminal identification information of the present invention.

The card company server 300 requests the service providing server 200 to transmit one-barcode identification information according to a request of the terminal 100 (S103). In this case, the card company server 300 may transmit the terminal identification information for identifying the terminal 100 together with the request to the service providing server 200, and the card company identification information for identifying the card company server 300 together with the request to the service providing server 200. Here, the card company identification information may include information on CI.

The service providing server 200 which receives the terminal identification information and the card company identification information determines whether pre-issued one-barcode identification information corresponding to the terminal identification information is present or not (S105). When it is determined that the pre-issued one-barcode identification information corresponding to the terminal identification information is not present, the service providing server 200 generates one-barcode identification information corresponding to the terminal identification information (S107). Here, the one-barcode identification information, which is information granted by the service providing server 200 to manage and identify the one-barcode corresponding to the terminal identification information, may be generated in a form of a serial number according to a number of combination methods such as the terminal identification information, card company identification information, a random number, and the like. However, the present invention is not limited thereto, and any information as long as it can be granted in a unique form corresponding to the terminal 100 may be generated as the one-barcode identification information using any method.

When the one-barcode identification information is generated through these processes, the service providing server 200 first transmits the one-barcode identification information to the card company server 300 (S109). Also, the service providing server 200 may store the card company identification information and the one-barcode identification information corresponding to the terminal identification information. In addition, since the one-barcode identification information of the present invention may be used as unique information on the terminal, the service providing server 200 may store and manage the terminal identification information and the card company identification information corresponding to the one-barcode identification information.

The card company server 300 which receives the one-barcode identification information from the service providing server 200 may complete the card issuing process according to the request of the terminal 100 (S111), and guide the completion of the card issuing process to the terminal 100 (S113).

Then, the terminal 100 may receive a card issued from the card company server 300 in an off-line or on-line method.

In addition, in S105, when the pre-issued one-barcode identification information corresponding to the terminal identification information is present in the service providing server 200, the service providing server 200 may provide the pre-issued one-barcode identification information to the card company server 300. That is, when the one-barcode identification information has been initially generated according to a request of an A card company server and a request of the other card company server occurs thereafter, the same one-barcode identification information corresponding to the terminal identification information is provided rather than new one-barcode identification information being generated, and thus a single one-barcode corresponding to a plurality of pieces of card information may be used.

A process after S113 will be described with reference to FIG. 6.

Referring to FIG. 6, in the method of providing the one-barcode service according to an embodiment of the present invention, when the terminal 100 receives a card issuing process completion notification from the card company server 300, since it means that the corresponding card is in a state which may be used, a one-barcode service application is executed (S201), and the following procedures may be performed.

The one-barcode service application may be executed by a request of the user of the terminal 100, and the one-barcode service application may be automatically executed immediately after the card issuing process completion notification is received from the card company server 300. In addition, the one-barcode service application of the present invention denotes an application provided by the service providing server 200. The one-barcode service application of the present invention may be executed by the terminal 100 in a state in which various pieces of information required for executing the one-barcode service application is stored within the terminal 100 and by the service providing server 200 according to a cloud streaming service method, and the terminal 100 may receive and output only a result screen according to the execution.

After the one-barcode service application is executed, the terminal 100 queries the service providing server 200 for one-barcode issue information (S203). In this case, the terminal 100 may transmit terminal identification information which may identify itself to the service providing server 200 together with the query. In addition, when each procedure in FIG. 5 is performed after the one-barcode service application is installed, unique identification information of the one-barcode service application may be used as the terminal identification information of the present invention.

The service providing server 200 which receives the terminal identification information determines whether the pre-issued one-barcode identification information corresponding to the terminal identification information is present or not in the terminal 100 according to the query of the one-barcode issue information of the terminal 100 (S205).

Then, the service providing server 200 determines the card information corresponding to the pre-issued one-barcode identification information in the terminal 100, and then transmits the one-barcode issue information including the one-barcode identification information and the card information corresponding thereto to the terminal 100 (S207).

The terminal 100 which receives the one-barcode issue information may generate a virtual card according to the pre-issued card information corresponding to the one-barcode identification information (S209) to display so that the user can recognize the virtual card. Here, a plurality of virtual cards may be generated, may include virtual card numbers which may be used in place of actual card numbers, and may be displayed in a list form.

Then, when it is determined that a selection input of any one virtual card is input from the user of the terminal 100, a one-barcode generation request may be transmitted to the service providing server 200 (S213). Here, the terminal 100 may add information on each virtual card to the one-barcode generation request generated corresponding to the card information, and transmit the information to the service providing server 200. When the plurality of virtual cards are present, information on the selected virtual card may be separately transmitted to the service providing server 200.

Then, a procedure of registering an available alliance company corresponding to the virtual card may be performed according to a control of the service providing server 200.

The procedure will be described with reference to FIG. 7.

Referring to FIG. 7, after S213 of FIG. 6, the service providing server 200 determines whether the available alliance company corresponding to the one-barcode identification information is registered or not according to the one-barcode generation request from the terminal 100 (S301). In other words, a single piece of one-barcode identification information is issued to the terminal 100 and a plurality of pieces of card information may be set to correspond to the single one-barcode identification information. For example, when three pieces of card information A, B, and C are set to correspond to the one-barcode identification information, and ten pieces of alliance company information may be set in each card information, the service providing server 200 may determine whether the alliance company information corresponding to the card information selected by the terminal 100 is registered or not. When it is determined that the alliance company information is not registered, a procedure of registering the alliance company information may be performed.

That is, the service providing server 200 may transmit an alliance company registration agreement request to the terminal 100 (S303). When an alliance company registration acceptance is received from the terminal 100, the service providing server 200 may transmit the terminal identification information of the terminal 100 and the one-barcode identification information to the alliance company server 400 and support a process in which the alliance company server 400 registers and stores the information (S309). That is, in a conventional method, the user has to separately perform a procedure of registering a card in each alliance company from a procedure of registering a card through the card company server 300. Further, information on the user of the terminal 100 has to be provided and registered to each alliance company. However, in the alliance company registration process according to the method of providing the one-barcode service of the present invention, the service providing server 200 provides only the terminal identification information and the one-barcode identification information to the alliance company server 400 to perform the alliance company registration process, and thus the alliance company may be more easily registered and used without complicated procedures. Further, the alliance company may be registered and used without exposing an excess of private information of the user in the alliance company registration process.

After S309, the alliance company server 400 may notify the service providing server 200 of a completion of registration (S311), and the service providing server 200 may guide the registration completion to the terminal 100.

In addition, in a case in which a plurality of alliance companies corresponding to the card information are present when the alliance company registration process is performed by the service providing server 200, the service providing server 200 may transfer the plurality of alliance company registration agreement requests to the terminal 100 in batches in S303. In this case, the service providing server 200 provides the one-barcode identification information to each alliance company server 400, and may support a process in which the one-barcode identification information is registered in each alliance company server 400. In other embodiment, the service providing server 200 may sequentially perform a plurality of alliance company registration processes, and may repeatedly perform S301 to S311 when a first alliance company registration process is completed.

When all alliance company registration processes are completed through these processes, the terminal 100 may complete the one-barcode generation process (S315). Here, the generated barcode may be generated in a one-dimensional barcode form or a two-dimensional barcode form called a quick response (QR) code.

When the one-barcode is generated in the one-dimensional barcode form or the two-dimensional barcode from, the terminal 100 may display the generated one-barcode (S317), and support a procedure in which the user of the terminal 100 scans the corresponding one-barcode at an alliance company store and uses an alliance company service.

Hereinafter, the method of providing the one-barcode service according to an embodiment of the present invention as described above will be described in terms of the service providing server 200.

Figure 8:
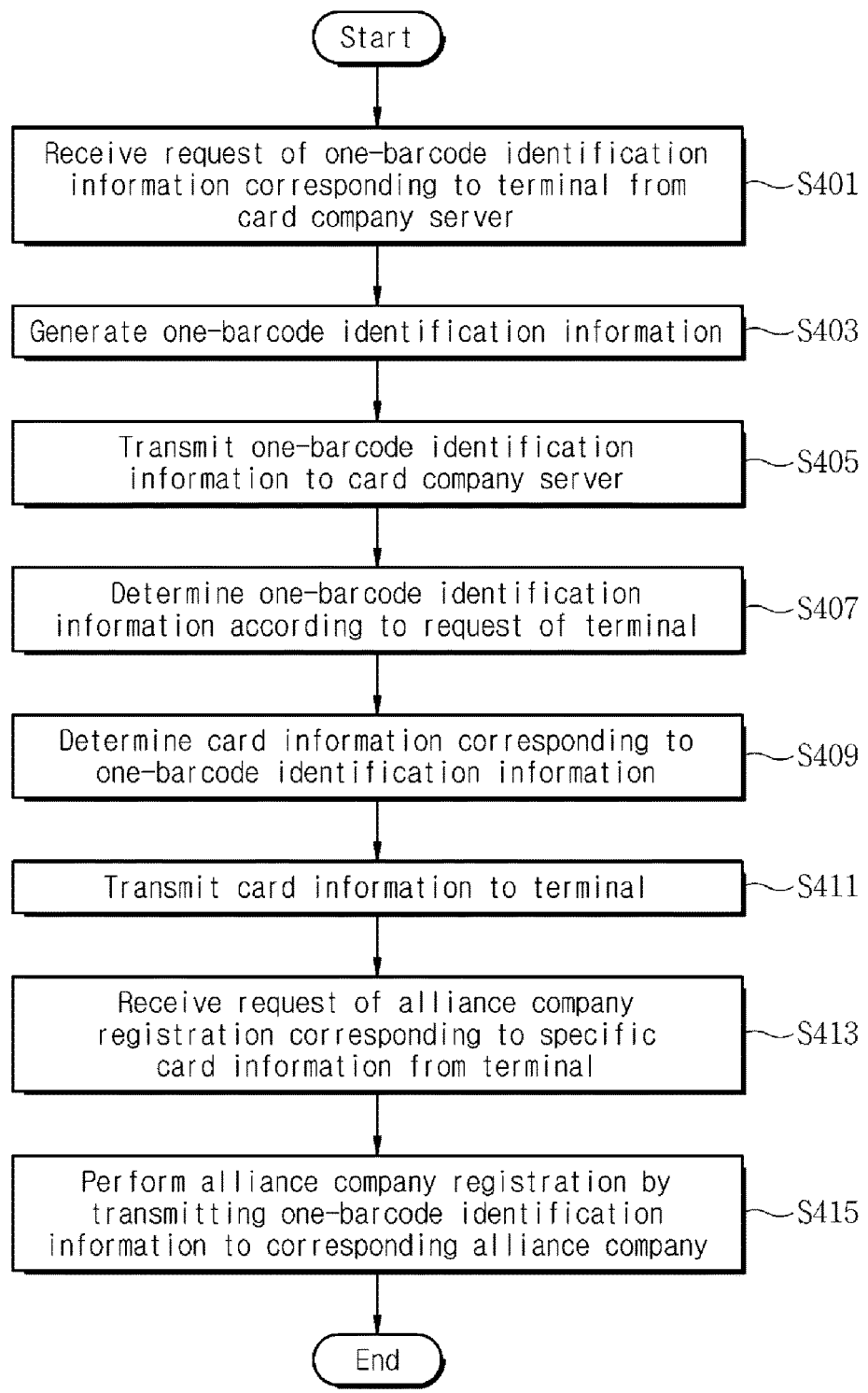
FIG. 8 is a flowchart for describing the method of providing the one-barcode service in a service providing server according to the embodiment of the present invention.

FIG. 8 is a flowchart for describing a method of providing a one-barcode service in a service providing server according to an embodiment of the present invention.

Referring to FIGS. 1 and 8, a service providing server 200 according to an embodiment of the present invention receives a request of one-barcode identification information from a card company server 300 according to a card issuing request of a terminal 100 (S401). In this case, the card company server 300 may transmit terminal identification information for identifying the terminal 100 together with the request to the service providing server 200, and card company identification information for identifying the card company server 300 together with the request to the service providing server 200. Here, the card company identification information may include information on CI.

The service providing server 200 which receives the terminal identification information and the card company identification information may determine whether pre-issued one-barcode identification information corresponding to the terminal identification information is present or not. When it is determine that the pre-issued one-barcode identification information corresponding to the terminal identification information is not present, the service providing server 200 may generate one-barcode identification information corresponding to the terminal identification information (S403).

Then, the service providing server 200 transmits the pre-issued one-barcode identification information corresponding to the generated one-barcode identification information or terminal identification information to the card company server 300, the card company server 300 which receives the pre-issued one-barcode identification information may complete a card issuing process according to a request of the terminal 100, and guide the completion of the card issuing process to the terminal 100.

Then, the terminal 100, in a state in which a one-barcode service application provided by the service providing server 200 is executed, may query the service providing server 200 for one-barcode issue information, and the service providing server 200 which receives the one-barcode issue information may determine to provide the one-barcode issue information according to the request of the terminal 100 to the terminal 100. Here, the one-barcode issue information may include the pre-issued one-barcode identification information corresponding to the terminal identification information. Further, in S403, when the one-barcode identification information is generated, the one-barcode identification information may include card information granted to the one-barcode identification information.

The service providing server 200 may determine the one-barcode identification information corresponding to the terminal 100 (S407), determine the card information corresponding to the one-barcode identification information (S409), and then add the card information to the one-barcode issue information to transmit to the terminal (S411).

Then, the terminal 100 may generate a virtual card according to the pre-issued card information corresponding to the one-barcode identification information to display so that the user can recognize the virtual card. Here, a plurality of virtual cards may be generated, and may include virtual card numbers which may be used in place of the actual card numbers and may be displayed in a list form. Then, when it is determined that a selection of any one virtual card is input from the user of the terminal 100, an alliance company registration request may be transmitted to the service providing server 200 (S413). The service providing server 200 which receives the alliance company registration request transmits the one-barcode identification information to the alliance company server 400 corresponding to specific card information according to the request of the terminal 100 and performs an alliance company registration procedure (S415). When the alliance company registration procedure is completed, the user of the terminal 100 may more easily subscribe to and use a plurality of alliance company services using a single barcode.

The method of providing the one-barcode service according to an embodiment of the present invention has been described above.

The method of providing the one-barcode service according to an embodiment of the present invention as described above may be provided in a form of computer-readable media suitable for storing computer program instructions and data. A program recorded in the recording medium for implementing the method of providing the one-barcode service according to an embodiment of the present invention may perform a process in which the terminal executes a one-barcode service application and queries a service providing server for one-barcode issue information, a process in which the terminal receives one-barcode issue information including one or more pieces of pre-issued card information corresponding to the one-barcode identification information from the service providing server, and a process in which the terminal performs a registration of the alliance company information capable of being registered corresponding to the card information included in the one-barcode issue information by being in connection with the service providing server.

In this case, the program recorded in the recording medium may be read by the computer to be installed and executed, and thus may perform the above-described functions.

Here, in order for the computer to read the program recorded in the recording medium and execute the functions implemented by the program, the above-described program may include codes coded using a computer language such as C, C++, JAVA, a machine language, or the like that can be read by a processor, that is, a central processing unit (CPU) of the computer through a device interface of the computer.

The codes may include functional codes related to the functions which define the above-described functions, and control codes related to execution procedures required for the processor of the computer to execute the above-described functions in a predetermined procedure. Further, the codes may further include additional information required for the processor of the computer to execute the above-described functions, or codes related to memory reference in which media is referred in any location (address number) of an internal or external memory of the computer. Further, in order for the processor of the computer to execute the above-described functions, when the processor of the computer needs to communicate with another remote computer or server, the codes may further include communication-related codes which control how the processor of the computer communicates with the another remote computer or server using a communication module of the computer, whether information and media is transceived during communication, or the like.

A non-transitory computer-readable recording medium suitable for storing the computer program instructions and data includes, for example, magnetic media such as hard disks, floppy disks, and magnetic tapes, optical media such as CD-ROMs and digital video disks (DVDs), magneto-optical media such as floptical disks, and a semiconductor memory such as a ROM, a RAM, an EPROM, and an electrically erasable programmable ROM (EEPROM). The processor and the memory may be supplemented by a special-purpose logic circuit or may be integrated into the special-purpose logic circuit.

Further, the computer-readable recording medium may be distributed in computer systems connected via a network and the computer-readable code may be stored and executed in a distributed manner. Also, functional programs, and codes and code segments related thereto, for implementing the present invention may be easily construed or changed by programmers skilled in the art to which the present invention pertains in consideration of an environment of the computer system which reads the recording medium and executes the program.

Each process according to the embodiments of the present invention may be implemented as computer-executable instructions and performed by a computing system. Here, the "computing system" is defined as one or more software modules, one or more hardware modules, or combinations thereof which operate to perform an operation on electronic data. For example, the computer system includes a software module such as an operating system of a personal computer, and a hardware component of the personal computer. The physical layout of the modules is not important. The computer system may include one or more computers connected via the network.

In the same manner, the computing system may be implemented as a single physical device in which an internal module such as a memory and a processor performing the operation on the electronic data.

That is, the device for providing the one-barcode service according to the present invention may be implemented to perform the above-described embodiments based on the computing system to be described below.

Figure 9:
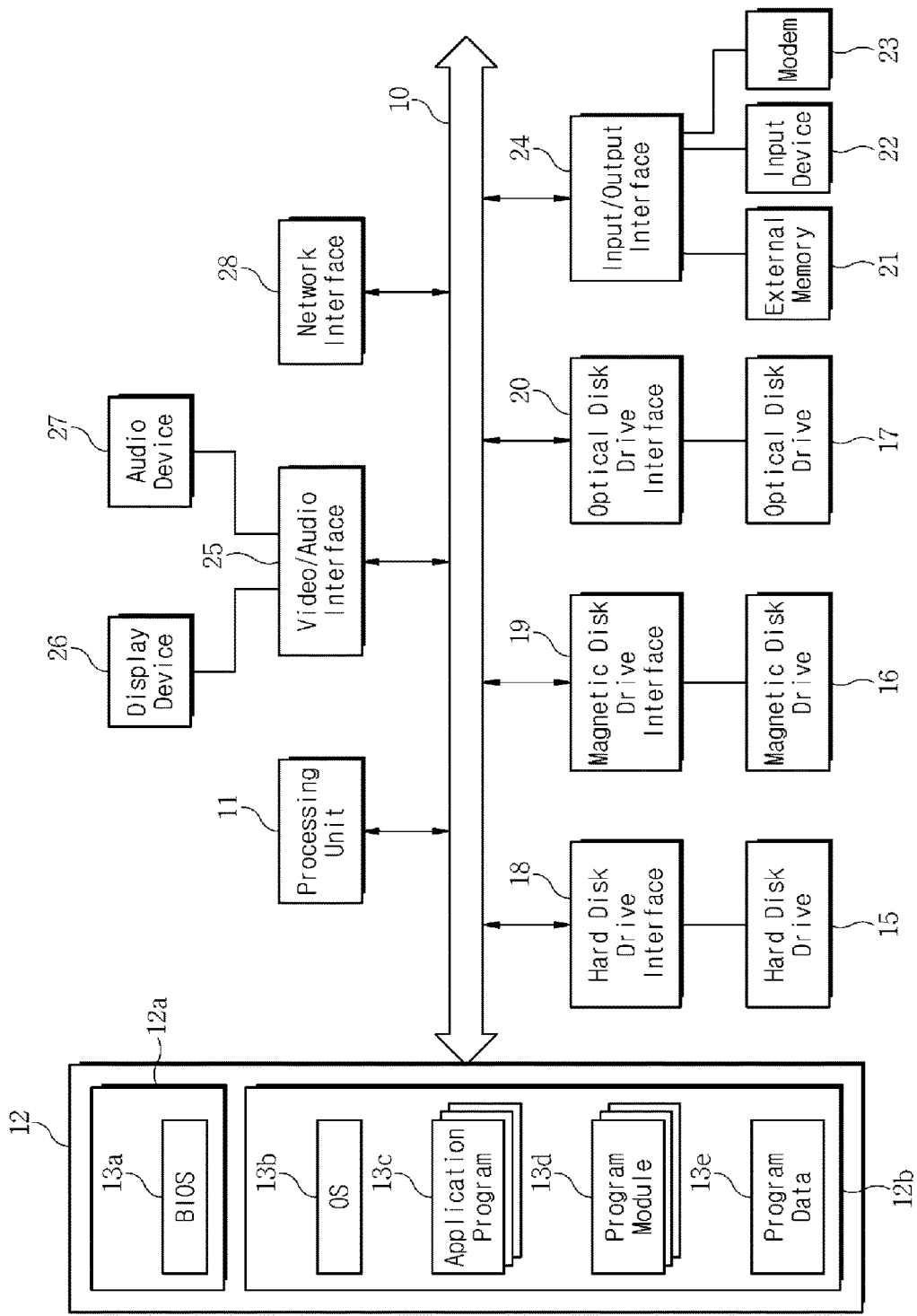
FIG. 9 is a diagram illustrating an operating environment of a device for providing the one-barcode service according to the embodiment of the present invention.

FIG. 9 is a diagram illustrating an operating environment of a device for providing the one-barcode service according to an embodiment of the present invention.

In FIG. 9 and the following description, an appropriate computing environment in which the present invention may be implemented will be simply and generally described. Although not a requirement, computer-executable instructions such as program modules executed by a computer system may be described in the present invention. In general, the program module includes a routine, a program, an object, a data structure, or the like, which executes a specific task or implements a specific abstract data type. The computer-executable instruction, the related data structure, and the program module represent an example of a program code means which executes acts of the present invention disclosed herein.

Referring to FIG. 9, an exemplary computing system which implements the present invention includes a computing device including a processing unit 11, a system memory 12, and a system bus 10 which connects various system components including the system memory 12 to the processing unit 11.

The processing unit 11 may execute computer-executable instructions designed to implement features of the present invention.

The system bus 10 may be a local bus which uses any one of various bus architectures, a peripheral bus, a memory bus, or any one of various types of bus architecture including a memory controller. The system memory 12 includes a ROM 12a and a RAM 12b. At a time such as during starting up, a basic input/output system (BIOS) 13a including basic routines which help to transmit information between components in the computing system may be stored in the ROM 12a.

The computing system may include a storage device, for example, may include a hard disk drive 15 which reads information from a hard disk or records information to the hard disk, a magnetic disk drive 16 which reads information from a magnetic disk or records information to the magnetic disk, and an optical disk drive 17 which reads information from an optical disk such as a CD-ROM or other optical media or records information to the optical disk. The hard disk drive 15, the magnetic disk drive 16, and the optical disk drive 17 are connected to the system bus 10 by the hard disk drive interface 18, the magnetic disk drive interface 19, and the optical disk drive interface 20, respectively.

Further, the computing system may further include an external memory 21 serving as a storage device. The external memory 21 may be connected to the system bus 10 through an input/output interface 24.

The above-described drives and a related computer-readable medium read and recorded by the drives provide a non-volatile storage of computer-executable instructions, data structures, program modules and other data. Although an exemplary environment described herein illustrates the hard disk drive 15, the magnetic disk drive 16, and the optical disk drive 17, the other type of computer-readable media which stores data including a magnetic cassette, a flash memory card, a DVD, a Bernoulli cartridge, a RAM, a ROM, or the like may be used.

A program coding means including one or more program modules including an operating system 13*b*, one or more application programs 13*c*, a program module 13*d*, and program data 13*e*, which are loaded and executed by the processing unit 11 may be stored in the hard disk drive 15, the magnetic disk drive 16, the optical disk drive 17, the ROM 12*a*, or the RAM 12*b*.

In addition, the computing system may receive an input of a command and information from the user through other input devices 22 such as a keyboard, a pointing device, a microphone, a joystick, a gamepad, a scanner, and the like.

These input devices 22 may be connected to the processing unit 11 through the input/output interface 24 connected to the system bus 10. The input/output interface 24 may logically represent, for example, any one of various different interfaces such as a serial port interface, a PS/2 interface, a parallel port interface, a Universal Serial Bus (USB) interface, and an Institute of Electrical and Electronics Engineers (IEEE) 1394 interface (i.e., a FireWire interface), or a combination thereof.

In addition, the computing system to which the present invention is applied may further include a display device 26 such as a monitor or a liquid-crystal display (LCD) or an audio device 27 such as a speaker or a microphone, and the devices are connected to the system bus 10 through a video/audio interface 25. For example, other peripheral output devices (not illustrated) such as a speaker, a printer, and the like may be further connected to the computer system 420. The video/audio interface 25 may include a high definition multimedia interface (HDMI), a graphics device interface (GDI), or the like.

Further, it is possible for the computing system which implements the present invention to connect to, for example, a network such as an office-wide or enterprise-wide computer network, a home network, an intranet and/or the Internet. The computer system may exchange data, for example, with external sources such as a remote computer system, a remote application, and/or a remote database through the network.

To this end, the computing system to which the present invention is applied includes a network interface 28 which receives data from the external sources and/or transmits data to the external sources.

In the present invention, the computing system may transmit and receive information to and from a remote device through the network interface 28. For example, when the computing system is the terminal 100, the computing system may transmit and receive information to and from the service providing server 200 through the network interface 28. On the other hand, when the computing system is the service providing server 200, the computing system may transmit and receive information to and from the terminal 100 through the network interface 28. For example, the network interface 28 may represent a logical combination of one or more software and/or hardware modules such as a network interface card and a corresponding network driver interface specification (NDIS) stack.

In the same manner, the computer system receives data from the external source or transmits data to the external source through the input/output interface 24. The input/output interface 24 may be connected to a modem 23 (e.g., a standard modem, a cable modem, or a DSL modem), and may receive data from the external source and/or transmit data to the external source through the modem 23.

Although FIG. 9 illustrates a suitable operating environment of the present invention, the principles of the present invention may be applied to any system which may implement the principles of the present invention through appropriate modifications if necessary. The environment illustrated in FIG. 9 is only exemplary, and only a small portion of various environments in which the principles of the present invention may be implemented is shown.

In addition, a program of the present invention and various pieces of information generated when the program is executed may be stored in and accessed by any computer-readable medium related to the computing system illustrated in FIG. 9. For example, some of the program modules and some pieces of related program data may be included in the operating system 13*b*, the application program 13*c*, the program module 13*d*, and/or the program data 13*e* in order to be stored in the system memory 12.

Further, when a mass storage device such as a hard disk is connected to the computing system, the program module and the related program data may be stored in the mass storage device. In the network environment, the program module or some part thereof related to the present invention may be stored in a remote computer system connected through the modem 23 of the input/output interface 24 or the network interface 28, for example, a remote memory storage device such as a system memory and/or a mass storage device related to computing systems of a user terminal 100 and a service providing server 200. The execution of the module may be performed in a distribute environment as described above.

While this specification includes details of a plurality of specific implementations, these should not be understood as limitations of any invention or the scope to be claimed, but should be understood as descriptions of features that can be specific to specific embodiments of the specific invention. Specific features described herein may also be implemented by being combined in a single embodiment in the context of the individual embodiment. On the other hand, various features described in the context of a single embodiment may be implemented individually or in appropriate sub-combinations in a plurality of embodiments. While features operate as specific combinations and are described and claimed initially as such, at least one feature may be excluded from claimed combinations in some cases, and the claimed combinations may be changed to sub-combinations or modifications of the sub-combinations.

Similarly, while drawings illustrate operations in a particular order, this does not mean that these operations should be performed in the illustrated specific order or sequence or that all illustrated operations should be performed in order to obtain a desired result. In a particular case, multi-tasking and parallel processing may be advantageous. Separation of various system components in the above embodiment does not mean that such separation is required for all embodiments. In general, described program components and systems may be integrated in a single software product or may be packed in multiple software products.

A specific embodiment of the subject described herein has been described above. Other embodiments fall within the scope of the appended claims. For example, operations referred to in the claims still may achieve the desired result while being performed in different orders. As an example, the processes illustrated in the accompanying drawings do not necessarily need to be performed in a specifically illustrated order or a sequential order in order to obtain the desired result. In a particular example implementation, multi-tasking and parallel processing may be advantageous.

The above descriptions provide a best mode of the invention and provide examples to describe the invention for those skilled in the art to manufacture and use the invention. In this specification, the invention is not limited to proposed specific terms. Therefore, while the invention has been described in detail with reference to the above-described examples, it will be understood by those skilled in the art that various changes, modifications, and alternations may be made without departing from the spirit and scope of the invention.

Therefore, the scope of the invention is defined not by the detailed description of the invention but by the appended claims.

The present invention relates to a method of providing a one-barcode service, and more particularly, to a method of providing a one-barcode service, in which a plurality of pieces of card information are registered using a single barcode, alliance company information in connection with each piece of card information are managed using the single barcode, and an alliance company service is used, and a system therefor.

According to the present invention, a plurality of pieces of card information are registered using a single barcode and alliance services in connection with each card are managed using the single barcode, and thus and convenience of alliance services as well as a user's card life can be further improved. Accordingly, the present invention can contribute to the development of service industries.

In addition, the present invention has a high probability of commercialization or sale, is clearly implementable in reality, and thus has industrial applicability.

In this specification, exemplary embodiments of the present invention have been classified into the first, second and third exemplary embodiments and described for conciseness. However, respective steps or functions of an exemplary embodiment may be combined with those of another exemplary embodiment to implement still another exemplary embodiment of the present invention.

What is claimed is:

1. A method of providing a one-barcode service, the method comprising:
   receiving, with a service providing server, a one-barcode identification information request from a card company server in response to a request by a terminal, wherein the terminal is configured to request card information including terminal identification information to the card company server;
   determining, with the service providing server, whether one-barcode identification information corresponding to the terminal identification information is stored in the service providing server;
   if it is determined that one-barcode identification information is stored in the service providing server, transmitting, with the service providing server, the stored one-barcode identification information to the card company server such that the card company server issues card information corresponding to the stored one-barcode identification information;
   if it is determined that one-barcode identification information is not stored, generating, with the service providing server, generated one-barcode identification information corresponding to the terminal identification information;
   transmitting, with the service providing server, the generated one-barcode identification information to the card company server such that the card company server issues card information corresponding to the generated one-barcode identification information;
   storing, with the service providing server, the card information and the generated one-barcode identification information;
   generating, with the terminal, a virtual card based on stored card information that corresponds to either the stored one-barcode identification information or the generated one-barcode identification information; and
   transmitting, with the terminal, a request for generating a one-barcode to the service providing server when the terminal selects the virtual card.

2. The method of claim 1, wherein the method further comprises:
   receiving, with the service providing server, a query regarding one-barcode issue information from the terminal;
   determining, with the service providing server, whether one-barcode identification information is stored in the service providing server;
   if it is determined that one-barcode identification information is stored, transmitting, with the service providing server, the one-barcode issue information including the card information to the terminal; and
   registering, with the service providing server, information regarding a merchant service provider upon a terminal request, wherein the merchant service provider is configured to provide service to a user having the card information.

3. The method of claim 2, wherein registering the information regarding the merchant service provider upon the terminal request comprises:
   determining, with the service providing server, whether the merchant service provider corresponding to the card information is registered;
   sending, with the service providing server, a registration request for the merchant service provider to the terminal when no merchant service provider corresponding to the card information is registered;
   receiving, with the service providing server, a registration of the merchant service provider from the terminal;
   transmitting, with the service providing server, at least one of the registered one-barcode identification information or the generated one-barcode identification information to corresponding merchant service provider server so that the merchant service provider server registers the at least one of the registered one-barcode identification information or the generated one-barcode identification information; and
   notifying the terminal of a registration of the at least one of the registered one-barcode identification information or the generated one-barcode identification information so that an one-barcode registered in merchant service provider is generated in the terminal.

4. A method of providing a one-barcode service, the method comprising:
   receiving, with a service providing server, a one-barcode identification information request from a card company server in response to a request by a terminal, wherein the terminal is configured to request card information to the service providing server;
   determining, with the service providing server, whether one-barcode identification information corresponding to the terminal is stored in the service providing server;
   if it is determined that one-barcode identification information is stored in the service providing servers, transmitting, with the service providing server, the stored one-barcode identification information to the card company server;

if it is determined that one-barcode identification information is not stored, generating, with the service providing server, generated one-barcode identification information corresponding to the terminal;

transmitting, with the service providing server, the generated one-barcode identification information to the card company server;

storing, with the service providing server, the card information and the generated one-barcode identification information, wherein the card company server is configured to issue card information that corresponds to either the stored one-barcode identification information or the generated one-barcode identification information;

generating, with the terminal, a virtual card based on stored card information that corresponds to either the stored one-barcode identification information or the generated one-barcode identification information;

transmitting, with the terminal, a request for generating a one-barcode to the service providing server when the terminal selects the virtual card;

when the card company server issues the card information, transmitting, with the service providing server, one-barcode issue information to the terminal, wherein the one-barcode issue information comprises at least one of the stored one-barcode identification information or the generated one-barcode identification information, and the card information;

accepting, by the service providing server, registration of a merchant service provider from the terminal, wherein the merchant service provider is configured to provide service to a user having the card information;

transmitting, with the service providing server, the at least one of the stored one-barcode identification information or the generated one-barcode identification information to a merchant service provider server;

storing, with the service providing server, information regarding the merchant service provider; and assisting, with the service providing server, the terminal with the registration of the merchant service provider.

5. A method of providing a one-barcode service, the method comprising:

receiving, with a service providing server, a one-barcode identification information request from a card company server in response to a request by a terminal, wherein the terminal is configured to request card information including terminal identification information to the card company server;

determining, with the service providing server, whether one-barcode identification information corresponding to the terminal identification information is stored in the service providing server;

if it is determined that one-barcode identification information is stored, transmitting, with the service providing server, the stored one-barcode identification information to the card company server such that the card company server issues card information corresponding to the stored one-barcode identification information;

if it is determined that one-barcode identification information is not stored, generating, with the service providing server, generated one-barcode identification information corresponding to the terminal identification information;

transmitting, with the service providing server, the generated one-barcode identification information to the card company server such that the card company server issues card information corresponding to the generated one-barcode identification information; and storing, with the service providing server, the card information and the generated one-barcode identification information.

* * * * *